Aug. 3, 1954

J. F. ATKINSON ET AL 2,685,684

OUTAGE MONITOR SYSTEM

Filed April 26, 1951

SAMUEL LUBIN & JOHN F. ATKINSON INVENTORS.

BY Arthur J. Connolly

THEIR ATTORNEY.

SAMUEL LUBIN & JOHN F. ATKINSON INVENTORS.

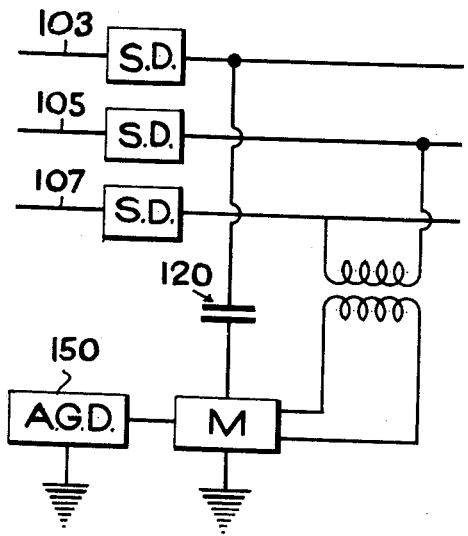
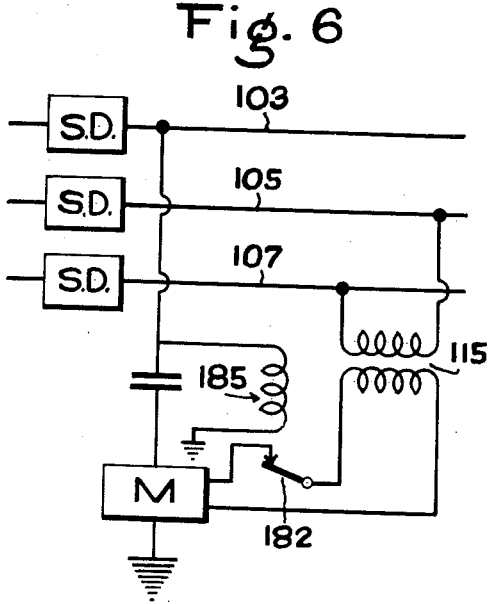
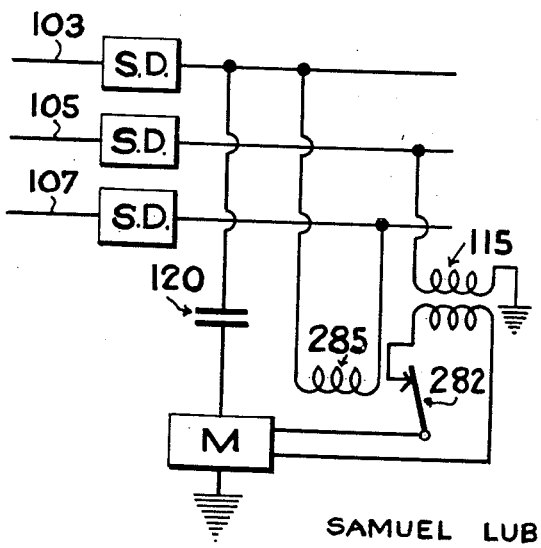
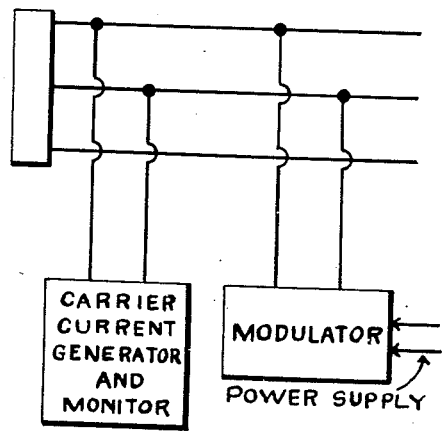
SAMUEL LUBIN & JOHN F. ATKINSON INVENTOR.
BY Connolly & Hutz
THEIR ATTORNEY Patented Aug. 3, 1954

2,685,684

UNITED STATES PATENT OFFICE 2,685,684

OUTAGE MONITOR SYSTEM

John F. Atkinson, Arlington, Va., and Samuel Lubin, Pittsfield, Mass., assignors to Sprague Electric Company, North Adams, Mass., a corporation of Massachusetts Application April 26, 1951, Serial No. 223,066

11 Claims. (Cl. 340—256)

This invention relates to remote monitoring systems, and particularly to remote monitoring systems for use with multiphase power transmission systems.

The present invention is a continuation-in-part of copending U. S. patent application Serial No. 757,422 filed June 27, 1947, now Patent No. 2,574,458, issued November 13, 1951, which describes remote monitoring systems in which a high frequency carrier wave is impressed on an electrical conductor, and modulated at a multiplicity of different individual low frequencies in accordance with a corresponding number of remote conditions to be simultaneously monitored. At a single location the presence of these individual modulating frequencies are detected, identified and indicated.

Copending U. S. patent application Serial No. 171,628 filed July 1, 1950 by Atkinson, Kelley and McCutchen describes another type of remote monitoring apparatus that may be employed in conjunction with the present invention.

The remotely located modulators described in the above copending applications are each suited for the monitoring of a single sectionalizing device normally used to automatically open a section of a transmission line when it becomes overloaded as by a short circuit and a multiplicity of monitoring assemblies are required, for example, to monitor the three sectionalizers of a three phase line.

Among the objects of the present invention are remote monitoring systems wherein a multiphase sectionalizing point may be monitored by means of a single monitoring assembly, each modulator being effective to indicate the operation of all the lines in a section of the transmission line system.

It is a further object of this invention to provide auxiliary circuits for use with modulators of the above disclosed types, for multiphase adaptation.

The above as well as additional objects of the present invention will become apparent from the following description of several of its exemplifications, considered in conjunction with the appended drawings wherein.

Figure 1:
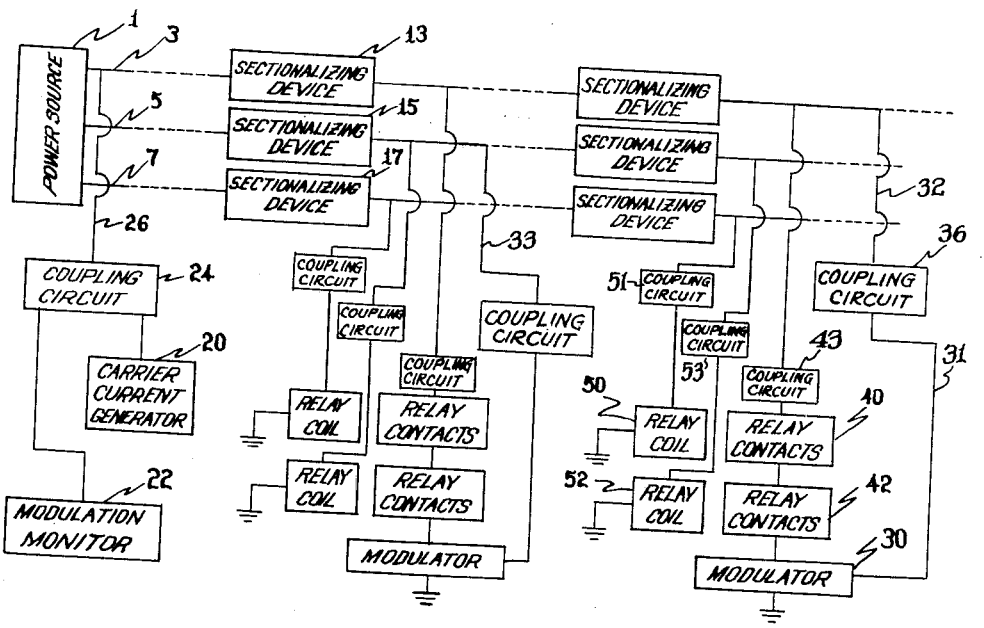
Fig. 1 is a diagrammatic layout of a remote monitoring system for monitoring a multiphase transmission line system in accordance with the present invention.

Figs. 5 through 8 inclusive are diagrammatic illustrations of further modified forms of the invention.

The modulators and detecting devices shown in the drawings are of the type fully described in the above copending applications and those descriptions are hereby incorporated in the present application as though fully set forth herein. Although three-phase power systems are specifically shown, the invention is not to be limited thereto, but is suitable for any multiphase system.

Referring particularly to Fig. 1, the system consists of a three phase power supply 1 feeding three elongated power transmission electrical conductors 3, 5 and 7 having groups of sectionalizing devices 13, 15 and 17 therein dividing the conductors into individual sections. A carrier current generator 20, and a modulation monitor or detecting device 22 are coupled through coupling circuit 24 to one conductor 3 of the transmission system by means of lead 26 as shown, respective circuits being completed through ground return connections not shown. Modulators 30 have energizing circuits separately connected through relay contacts 40, 42 and coupling circuit 43 to the individual sections of line 3 between successive sectionalizing devices 13. Relay contacts 40, 42 are normally open, series connected and actuated through relay coils 50, 52 which are in turn energized through coupling circuit 51, 53 from conductors 7 and 5 respectively. Each modulator has its modulation output lead 31 connected to any of the lines, as shown for example by connections 32 and 33, coupling circuits 36 being also provided in the modulation output line.

In operation, the carrier current generator 20 supplies a high frequency carrier current to conductor 3. By reason of the intercoupling normally present between and among the three conductors, this carrier current generally appears on all three conductors 3, 5 and 7, and is amplitude modulated by the individual modulators 30 each of which has its own characteristic rate of amplitude modulation. The modulation signals, or their absence, are in turn detected by modulation monitor 22 as more completely set forth in the above-identified copending applications. Thus, should a fault occur along a section of the transmission system, the modulation signal identified with the faulted section and all more distant modulators connected through this section will not be detected at monitor 22 and the fault may readily be located. The operation of a single phase unit is fully explained in the copending applications.

In the usual transmission line system, carrier currents having a frequency above about 50 kilocycles per second, whether modulated or unmodulated, cannot be kept from spreading to all the line conductors. It would therefore be expected that an outage or line fault would not be indicated unless all the conductors were simultaneously affected. However, in accordance with the present invention faults with any one of the line conductors will be accurately shown. Furthermore, only one modulator is required to locate a fault in any of the lines of a single section. These desirable results are accomplished by use of novel connection circuits for the modulator 30.

In the construction of Fig. 1 the novel connection circuit is confined to the modulator energization which is established through conductor 3. A fault in this conductor will directly interrupt the modulation signal. In order to expand the monitor to also indicate faults in conductors 5 and 7, the power supply of modulator 30 is directed through a circuit connected to open in response to faults in either line 5 or line 7. In the illustrated construction this is accomplished by series connected relay contacts 40, 42. Relay coils 50, 52 which energize the respective contacts 40, 42 are connected for separate energization by conductors 5 and 7. Should a fault occur in conductor 5 or 7 one of the sets of relay contacts 40, 42 will open and effectively deenergize modulator 30 thus indicating the fault. This system identifies the fault at a certain section of the system. It is a simple matter to then locate the difficulty causing the particular fault.

Figure 2:
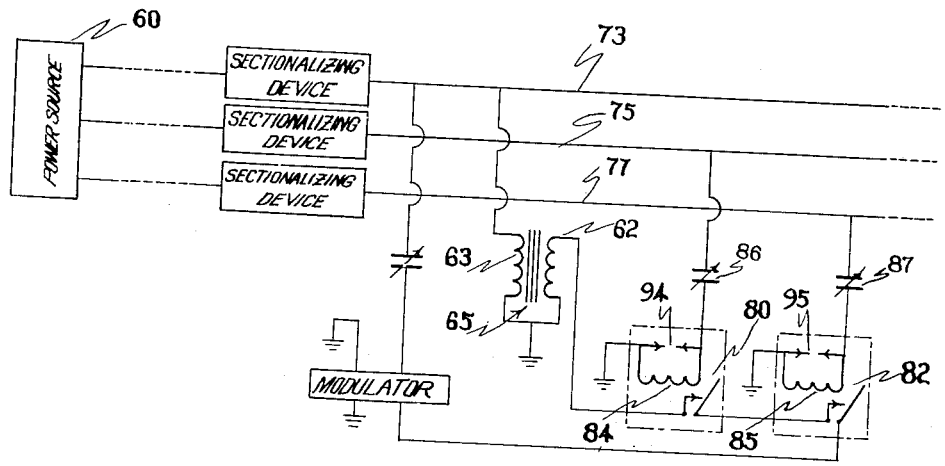
Fig. 2 shows the details of one form of remote monitoring system for a three-phase line.

Fig. 2 shows a three phase system using a specific embodiment of this invention. Here line 73 of a three phase system fed by power supply 60 is coupled by means of transformer 65 to a modulator energizing circuit having relay contacts 80, 82 in series. The primary 63 of transformer 65 is connected at one end to power transmission conductor 73 and is grounded at its other end. Secondary 62 of the transformer also has one terminal grounded to complete the energizing circuit to the modulator. The contents 80, 82 are controlled by relay coils 84, 85 connected to conductors 75, 77 respectively through fixed or adjustable capacitors 86, 87. The carrier current generator and the modulator are not shown in this figure. Should a fault occur in any conductor the monitor will operate in the manner disclosed with reference to Fig. 1. Spark gaps 94, 95 are shunted across relay coils 84, 85 to protect them from overvoltage or lightning surges on the power line. While A. C. relays are shown, D. C. relays with suitable rectifiers may be employed.

Figure 3:
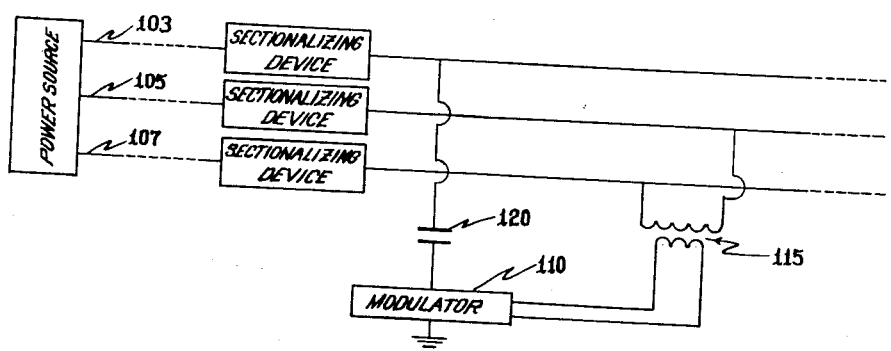
Fig. 3 shows a modified form of a three-phase remote monitoring system.

Fig. 3 shows another three-phase circuit in accordance with this invention. Here the system is arranged as by lowering the carrier current frequency or shielding the lines from each other so that the carrier is restricted to the individual conductor upon which it is impressed. No relays are required. The three-phase line 103, 105, 107 supplies energizing power to modulator 110 by transformer 115 having a primary winding connected at one end to conductor 105 and at the other end to conductor 107. The modulator output is connected to conductor 103 through coupling capacitor 120. Should a fault occur in conductor 103 much less carrier current will reach the modulation monitor, and should a fault occur in conductor 105 or 107 modulator 110 will be deenergized. In any event, the fault will be readily detected by the monitor (not shown). Where modulated or unmodulated high frequency carrier signals readily by-pass a break in one line by reason of the close coupling of this line, at the break or elsewhere, with another unbroken line that extends beyond the break, the by-passing action can be minimized by connecting the modulator output lead to a part of a sectionalizing device that when tripped becomes substantially completely isolated from the line.

Figure 4:
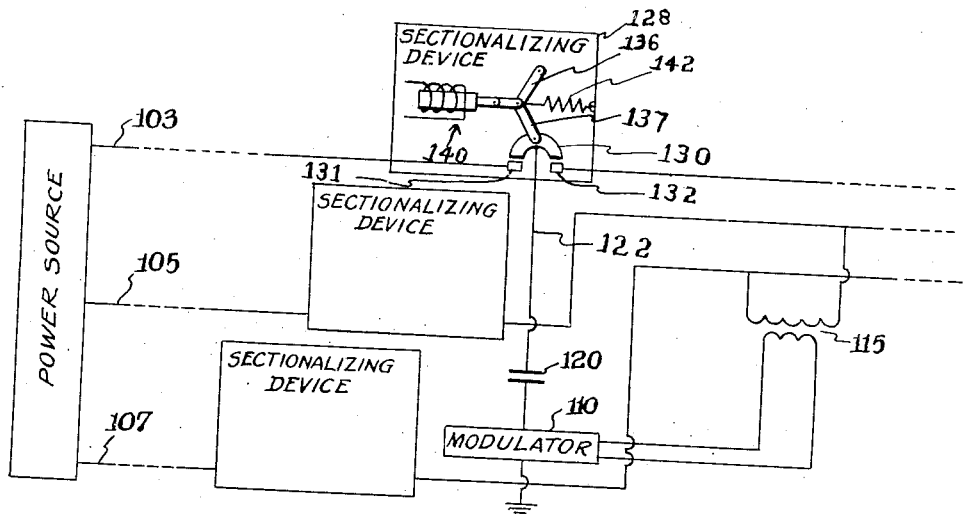
Fig. 4 shows a different embodiment of the modified form.

Fig. 4 shows an embodiment of this form of the invention. Here sectionalizing device 128 in line 103 has a movable circuit-opening link 130 arranged to cooperate with fixed contacts 131, 132 to open and close the circuit of line 103. The link is shown in circuit-opening position where it is held by toggle arms 136, 137 and solenoid 140, against the circuit-closing action of return spring 142. Modulation output lead 122 is connected to link 130 and for best results extends perpendicularly to the other line conductors 105, 107 and is as short as possible. The sectionalizing devices in lines 105, 107 may be either of the type shown at 128 or of the single contact type.

Operation of the construction of Fig. 4 is improved by so arranging the circuit-opening link 130 that it is at least partially shielded from the adjacent sections of the line when in open circuit position. This minimizes the high frequency coupling between lead 122 and the line conductors. The connection of lead 122 to link 130 can be simplified by incorporating in modulator 110 any of the well-known automatic grounding devices to insure the grounding of the capacitor 120 should the normal ground return of this capacitor through the modulator become broken. This form of the invention is partially illustrated in Fig. 5 of the drawings, wherein a system similar to that previously described with respect to Fig. 3 is shown, including the modulation network which is designated by the like numerical subscripts. The modified system includes an automatic grounding device 150 connected between the modulator and ground for the purpose above described. This assures the continual grounding of capacitor 120 so that the potential of its grounded terminal is maintained not far from ground whenever the usual connection of the modulator to ground becomes interrupted.

It will accordingly be possible to keep the external lead from link 130 at a low voltage, as by incorporating capacitor 120 into the casing of the sectionalizing device 128 so that the external leads do not require the enormous high voltage insulation bushing otherwise required for line voltage protection. Since the modulation energizing power need only be at 220 volts potential or even less, the insulation of such a lead is a very simple matter. The capacitor 120 when introduced into the casing of sectionalizing device 128 can be of any convenient form such as the conventional line capacitors, but does not require the external high-voltage insulation of these capacitors.

If desired the modulation energizing circuit of the invention may combine some of the features of the construction of Fig. 2 with some of the features of the construction of Fig. 3, as by inserting in the secondary circuit of transformer 115 in Fig. 3, a set of relay contacts operated by a relay winding energized from line 103. This form of the invention is shown in Fig. 6 of the drawings wherein a modulation system similar to that of Fig. 3 includes a set of relay contacts 182 in the secondary circuit of transformer 115, the contacts of the relay being normally open but being adapted to be closed upon the energization of a relay winding 185 connected between line 103 and ground. It will thus be apparent that a fault in any line of the system will result in deenergization of the modulator.

Alternatively a transformer may be used with its primary connected between the conductor 105 of Fig. 3, and ground, and its secondary connected in series through the contacts of a relay whose coil is connected for energization between conductors 103 and 107. This modification of the invention is illustrated in Fig. 7 of the drawings wherein a relay is provided, the relay having a set of normally open relay contacts 282 in the secondary of transformer 115 and an operating winding 285 connected across lines 103 and 107 for energization thereby to close contacts 282. The relay arrangement is such that upon deenergization of winding 285, contacts 282 open to interrupt the secondary circuit of the transformer and deenergize the modulator.

In addition, the circuit of the invention can be extended to transmission lines of 4, 5, 6 or more conductors by merely increasing the number of modulation energizing controls. It will also be appreciated that the invention is equally applicable to so-called 2-phase transmission lines utilizing only two line conductors, one having a potential above ground and the other having a potential below ground.

Instead of applying the carrier signals between one line conductor and ground, they may be applied between one line conductor and another as shown in Fig. 8 or between one or more line conductors and two or more others. This so-called balanced type of transmission reduces the distributing effects of high frequency coupling between conductors and improves the operation of the construction of Fig. 3, particularly where the carrier is impressed between conductor 103 and both of the other conductors 105 and 107. Even the higher frequency carriers when so transmitted will show a marked drop in intensity upon the occurrence of a fault in conductor 103 and will positively operate the monitor.

According to the present invention, line faults are indicated whether they are line breaks (open circuits) or shorts to ground or to another line. The open circuits directly interrupt the modulation and the monitor shows when the modulation is absent. Short circuits in any line will, by reason of the heavy current that is thereby caused to flow, operate the sectionalizing device in the particular line circuit. This operation of a sectionalizing device opens the circuit in this line so that the appartus responds in exactly the same way as an open line circuit. The sectionalizing devices are also tripped in response to line-to-line shorts so that the same type of monitoring thereby results. In the usual type of sectionalized line constructions the sectionalizing devices are graded so that those further from the power source respond to lower currents and the one immediately preceding a line short is generally the only one that trips. If a second one also trips open the normal reclosing action will return the second one to line closing condition.

Attention is also directed to the fact that the monitoring devices of the invention will indicate open circuit line faults whether or not sectionalizing devices are used. This feature of the invention can be put to good use by installing the modulators at the extreme ends of the line section remote from the sectionalizing device on the power supply side. Under certain conditions there may be a line break that is not accompanied by a short circuit or appreciable overcurrent so that the sectionalizing device is not tripped. The remotely positioned modulator however will show this type of outage fault.

The modulator applied to the carrier in accordance with the present invention is not restricted to amplitude modulation. Other types such as frequency, phase or pulse modulation can also be used. The particular modulation circuit utilized is not critical, although some enable sharper monitoring or more modulation stations per unit of modulation band width.

The output connection of the modulator need not be coupled directly to a line conductor as shown in Fig. 1 for example, but may be led to any of the modulation energizing leads or other conductors connected to the line. Where coupling circuits used with the energizing leads or other conductors pass the carrier currents to a sufficient extent, the modulation output can even be connected on the side of the coupling circuit remote from the line.

The application of modulated carrier currents between different line conductors can also be used by itself to monitor more than one line conductor. Thus in a two-phase line this is all that is necessary to effect complete monitoring, and the modulator energization can accordingly be entirely independent of the line if desired. For three-phase lines a similar balanced monitoring of two of the line conductors can be had if the third conductor is prevented from acting as a carrier coupling across faults in the two modulation-balanced lines. To this end the third line can be arranged to be between the first two so that any capacitive or inductive carrier coupling between the central line and one of the side lines is substantially balanced by a similar coupling to the other side line. The central line conductor can then be used as a modulation energizing supply so that all three lines are monitored.

It should also be noted that the common coupling of the carrier supply and monitor to the line as shown in Fig. 1 is only illustrative and that these elements can be separately coupled to the same or different portions of the line.

As many apparently widely different embodiments of this invention may be made without departing from the spirit and scope hereof, it is to be understood that the invention is not limited to the specific embodiments hereof except as defined in the appended claims.

What is claimed is:

1. In a remote monitoring system for checking, at a single location, on the operation of a plurality of remotely located sections of a multiphase power transmission system having at least two elongated power transmitting electrical conductors; a carrier current generator connected to impress a high frequency carrier current on one of said conductors; a modulator located at each of said sections and connected to one conductor for modulating said carrier current; each of said modulators having its own characteristic modulation; and monitoring means connected to a carrier current carrying conductor for detecting at a central location each of said characteristic modulations; each of said modulators including an energizing circuit connected to interrupt the modulator energization in response to a fault in any of at least two different conductors, for simultaneously monitoring these conductors.

2. In a remote monitoring system for checking, at a single location, on the operation of a plurality of remotely located sections of a multi-phase power transmission system having three elongated power transmitting electrical conductors; a carrier current generator connected to impress a high frequency carrier current on said conductors; a modulator located at each of said sections and connected to modulate said carrier current; each of said modulators having its own characteristic modulation; and monitoring means connected to a carrier current carrying conductor for detecting at a central location each of said characteristic modulations; each of said modulators including an energizing circuit connected to one line conductor through a series of pairs of normally open relay contacts each relay of which is connected to respond to actuation by the power transmitted through a different one of the other conductors to close and maintain the modulator energization, and to interrupt the modulator energization in the event of any fault in the conductors.

3. The combination as defined by claim 1 wherein the energization circuit connected to interrupt the modulator energization in response to a fault, comprises a transformer coupled series circuit, the primary of said transformer being connected between one of said conductors and ground, the secondary of said transformer being connected through a number of pairs of normally open relay contacts said number corresponding to the number of remaining transmission line conductors, each pair of contacts being connected to respond to actuation by the power transmitted through a different one of said remaining transmission line conductors to close and establish the modulator energization, and to interrupt the modulator energization in the event of any fault in said remaining transmission line conductors.

4. The combination as defined by claim 3 wherein the multiphase power transmission system is a three-phase system having three elongated power transmission electrical conductors, and the secondary of the transformer coupled series circuit is connected through a series of two pairs of normally open relay contacts.

5. The combination as defined by claim 1 in which the modulators each include output connection elements restricting the modulation supply to the connected line conductors for indicating an outage on at least one of the conductors, and the energizing circuit of each modulator is connected to open in response to any outage of the remaining line conductors.

6. The combination as defined by claim 1 in which the generator and modulators each include output connection elements providing a balanced modulation supply to at least two of the line conductors for indicating an outage on at least one of these conductors and the energizing circuit of each modulator is connected to open in response to an outage on any of the remaining line conductors.

7. The combination as defined by claim 1 in which each energizing circuit includes an energizing transformer having a primary winding connected between two of the line conductors for responding to any outage on said two conductors, and the modulator having an output circuit connected to respond to outages on the remaining conductors.

8. The combination as defined by claim 1 in which each energizing circuit includes an energizing transformer having a primary winding connected between two of the line conductors for responding to any outage on said two conductors, the transformer having a secondary winding connected to respond to outages on the remainder of said conductors.

9. A remote monitoring system for polyphase power transmission lines including plural electrical phase conductors comprising, a signal applying structure connected to impress a distinguishably modulated current on said lines at one point to cause the lines to carry a distinguishably modulated carrier current, a monitor connected to said phase conductors at another point to identify and indicate the presence of said distinguishable modulation, said signal applying structure having energizing circuit connections to each of said phase conductors for energization only when all of the conductors are functioning.

10. A combination set forth in claim 9 in which said energizing circuit connections include a transformer having the primary thereof connected across two of said phase conductors and the secondary thereof connected to said modulator.

11. The combination set forth in claim 9 in which said energizing circuit connections include a series of relay operated switches connected to be operated in response to the functioning of at least some of said phase conductors.

References Cited in the file of this patent

UNITED STATES PATENTS

| Number | Name | Date |
| --- | --- | --- |
| 1,134,752 | Leonard | Apr. 6, 1915 |
| 2,459,639 | Goldsborough | Jan. 18, 1949 |
| 2,574,458 | Atkinson | Nov. 13, 1951 |